Figure 1:
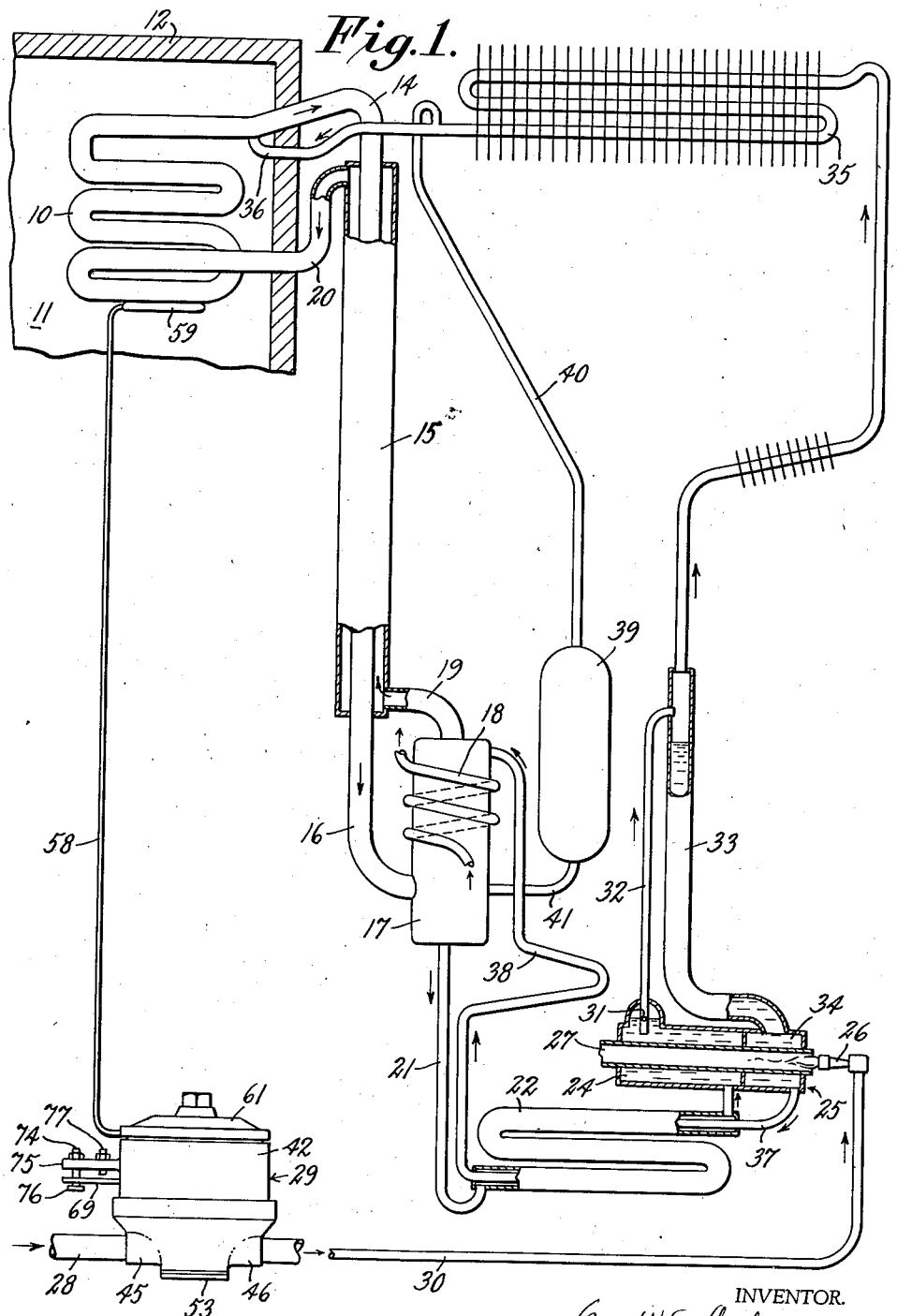

Nov. 23, 1943.  S. W. E. ANDERSSON  2,334,803
REFRIGERATION
Filed Feb. 20, 1940  2 Sheets-Sheet 1

INVENTOR.
Sven W. E. Andersson
BY
his ATTORNEY.

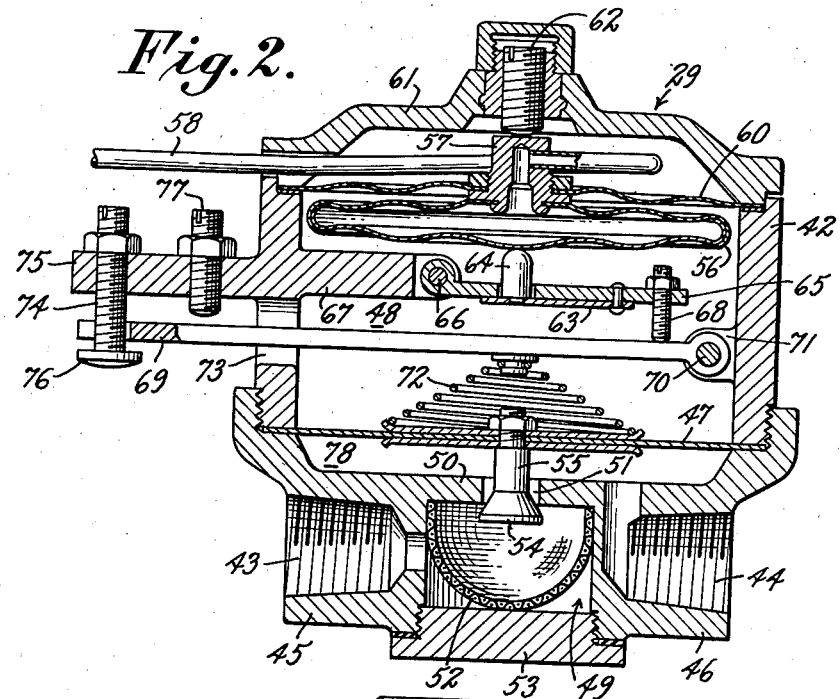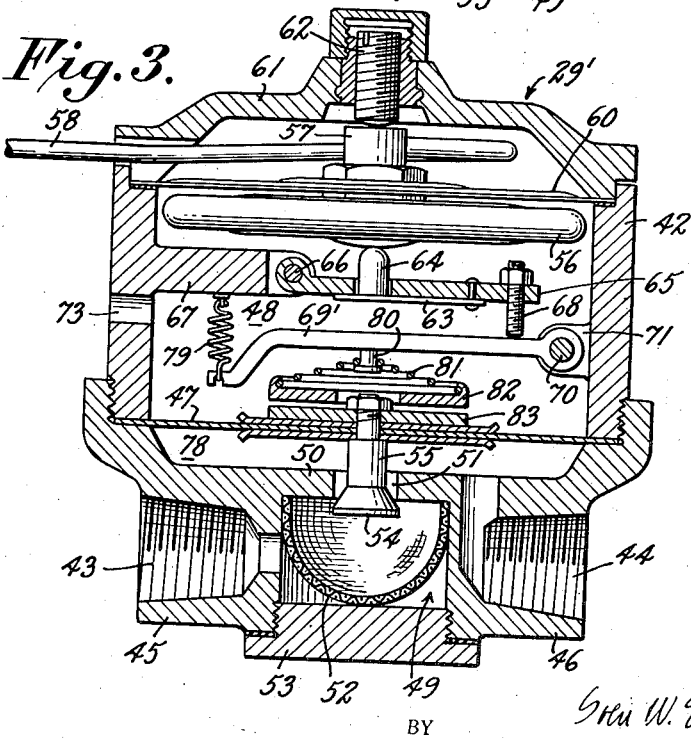

Patented Nov. 23, 1943

2,334,803

UNITED STATES PATENT OFFICE 2,334,803

REFRIGERATION

Sven W. E. Andersson, Evansville, Ind., assignor to Servel, Inc., New York, N. Y., a corporation of Delaware Application February 20, 1940, Serial No. 319,813

1 Claim. (Cl. 236—92)

My invention relates to refrigeration, and more particularly to control of refrigeration apparatus.

It is an object of the invention to provide an improved control device for controlling the heat supply of refrigeration apparatus operated by heat. More particularly, it is an object of the invention to provide such a device which is simple and compact and in which a valve is connected to a movable diaphragm and the device is so constructed and arranged that the valve is operative to regulate the pressure of fluid fuel and in addition is also responsive to temperature to control the flow of fuel. Another object of the invention is to provide for maximum and minimum flow of fluid fuel in such a device in which the pressure of the fuel is regulated and the rate of flow of fuel is also thermostatically controlled.

The above and other objects and advantages of the invention will be more fully understood from the following description taken in conjunction with the accompanying drawings forming a part of this specification, and of which Fig. 1 diagrammatically illustrates refrigeration apparatus of an absorption type provided with a control device embodying the invention; Fig. 2 is an enlarged vertical sectional view of the control device shown in Fig. 1; and Fig. 3 is a vertical sectional view similar to Fig. 2 illustrating a modification of the invention.

Referring to Fig. 1, I have shown my improved control device in connection with an absorption refrigeration apparatus of a uniform pressure type employing a pressure equalizing gas, and like that generally described in Patent No. 1,609,334 to von Platen and Munters. The apparatus or system includes a cooling element or evaporator 10 disposed in an enclosed space 11 which may form a food storage compartment of a thermally insulated refrigerator cabinet 12. A refrigerant fluid, such as ammonia, evaporates in the evaporator 10 and diffuses into an inert gas, such as hydrogen, to produce a refrigerating effect. The resulting gaseous mixture of ammonia and hydrogen flows from evaporator 10 through conduit 14, gas heat exchanger 15, and conduit 16 into an absorber 17.

In absorber 17 ammonia vapor is absorbed out of rich gas by a suitable liquid absorbent, such as water, the heat liberated with such absorption of ammonia vapor being transferred to a cooling medium which flows through a coil 18 surrounding the absorber 17. The inert hydrogen gas is returned to evaporator 10 through conduit 19, the gas heat exchanger 15 and conduit 20; and the enriched absorption liquid is conducted through a conduit 21, liquid heat exchanger 22, and conduit 23 into chamber 24 of generator 25.

The generator 25 is heated by a gas burner 26 which projects its flame into the forward end of a horizontal flue 27 which extends through the generator. A suitable combustion gas is delivered from a source of supply through conduit 28, control device 29 which will be described hereinafter, and conduit 30 to the burner 26.

The heat applied to the generator causes ammonia vapor and absorption liquid in chamber 24 to pass through an opening 31 in the lower end of a small vertical conduit 32 which constitutes a vapor-lift and conducts ammonia vapor and absorption liquid to the upper part of a standpipe 33. The liberated ammonia vapor entering standpipe 33 from conduit 32, and the ammonia vapor expelled from solution in standpipe 33 and chamber 34, is liquefied in an air-cooled condenser 35. The liquefied ammonia flows from condenser 35 through conduit 36 to the evaporator 10 to complete the refrigerating cycle. The weakened absorption liquid from which ammonia has been expelled is conducted from chamber 34 through conduit 37, liquid heat exchanger 22 and conduit 38 into the upper part of absorber 17.

A pressure vessel 39 is connected by conduits 40 and 41 to the lower part of condenser 35 and to the gas circuit, as at the absorber 17, for example, so that any hydrogen which may pass into the condenser can flow into the gas circuit. Ammonia vapor not liquefied in condenser 35 flows through conduit 40 to displace hydrogen in vessel 39 and force such hydrogen through conduit 41 into the gas circuit, thereby raising the total pressure in the system so that an adequate condensing pressure is obtained to insure condensation of ammonia vapor in condenser 35.

In accordance with my invention the flow of gas to the burner 26 is controlled by the control device 29. Referring to Fig. 2, the control device 29 includes a casing 42 having inlet and outlet openings 43 and 44 formed within bosses 45 and 46 to which are connected the conduits 28 and 30, respectively. A resilient diaphragm 47 is secured at its peripheral edge between the two parts of casing 42 to form an upper chamber 48 and a lower chamber 49, and in the lower chamber is provided a partition 50 having an orifice 51 to form a passage for flow of gas from the inlet 43 to the outlet 44.

In the lower chamber 49 and between the orifice 51 and inlet 43 is arranged a filter 52. A plug 53 threadedly secured to the lower part of casing 42 provides access to the lower chamber for removing and cleaning the filter 52. The lower side of partition 50 at the orifice 51 serves as a seat for a throttle valve 54 having a stem 55 secured to the diaphragm 47.

In the upper part of chamber 48 is arranged a thermal element 56. The thermal element is in the form of an expansible diaphragm which is secured to and in open communication with a hollow hub member 57. To the hollow hub member 57 is connected one end of a tube 58 having the other end thereof connected to a thermal bulb 59 arranged in thermal contact with the cooling element 10 of the refrigeration system, as shown in Fig. 1. The hub member 57 is mounted on a resilient diaphragm 60 which is secured at its peripheral edge between the upper end of casing 42 and a cover plate 61 having an opening through which the tube 58 passes. The cover plate 61 is provided with an adjustment screw 62 for adjusting the position of the resilient diaphragm 60 and hence the position of the expansible diaphragm 56.

The expansible diaphragm 56, tube 58 and bulb 59 constitute an expansible fluid thermostat which contains a suitable volatile fluid that increases and decreases in volume with corresponding changes of temperature. The expansible diaphragm 56 expands and contracts with an increase and decrease in volume of the volatile fluid, and these movements are transmitted to diaphragm 47 to effect control of the valve 54.

The structure in chamber 48 for transmitting movements of the expansible diaphragm 56 to the diaphragm 47 includes a relatively strong flat spring 63 having a knob 64 at one end thereof against which the expansible diaphragm 56 is adapted to bear. The spring 63 is secured to the under side of a lever 65 having an opening through which the knob 64 extends. The lever 65 is pivotally connected at one end at 66 to an inward extending projection 67 of the casing 42. The opposite end of lever 65 is provided with an adjustable screw 68 which is adapted to bear against the upper side of a lever 69 which is pivoted at 70 to a lug 71 formed within casing 42.

Between the under side of lever 69 and diaphragm 47 is disposed a coil spring 72. The lever 69 extends through an opening 73 in casing 42, and the outer end thereof is provided with an opening to receive a screw 74 which is threadedly secured to a projection 75 formed on the exterior of casing 42. The screw 74 is provided with an enlarged head 76 to limit the extent of downward movement of lever 69. A second screw 77 threadedly secured to projection 75 is provided to limit the extent of upward movement of the lever 69.

The control device 29 just described is capable of controlling valve 54 and hence the flow of gas to the burner 26, so that the evaporator or cooling element 10 of the refrigeration system will maintain the space 11 substantially at a desired low temperature. When the cooling element 10 tends to rise above the desired low temperature, the volatile fluid of the expansible fluid thermostat increases in volume and causes the expansible diaphragm 56 to expand whereby the spring 63 is moved downward. With such downward movement of the spring 63, the lever 65 to which it is secured is also moved downward. The lever 65, screw 68 and lever 69 are so arranged that a small downward movement of lever 65 produces a much greater movement of lever 69, thereby increasing the tension of spring 72 which may be referred to as a regulating or load spring. This increases the force exerted on the top side of diaphragm 47, whereby the latter moves downward against the force exerted on the under side of the diaphragm by the gas under pressure in chamber 78. When lever 69 contacts the enlarged head 76 of screw 74, the tension of load spring 72 is at a maximum and the force exerted on the top side of diaphragm 47 is such that valve 54 is in its full open position.

With the valve 54 in its full open position, gas flows to the burner 26 at such a rate that the heat applied to the refrigeration system is effective to heat refrigerant to its vaporization temperature or boiling point, so that refrigerant is vaporized and expelled out of solution from absorption liquid. With the burner flame of such size that refrigerant is expelled out of solution from absorption liquid, the refrigeration system operates in the manner described above to produce a refrigerating effect in the storage space 11.

When the cooling element 10 tends to fall below the desired low temperature, the volatile fluid of the expansible fluid thermostat becomes reduced in volume and causes the expansible diaphragm 56 to contract, whereby the tension of load spring 72 is reduced and less force is exerted on the top side of diaphragm 47. With less force exerted on the top side of diaphragm 47 the latter moves upward due to the force exerted on the under side of the diaphragm by gas under pressure in chamber 78. When the lever 69 contacts the end of screw 77 the valve 54 is in such a position that gas flows to the burner at a reduced rate and only heat of liquid is supplied to the refrigerant and the refrigerant is heated to a temperature below its vaporization temperature. Since refrigerant is not expelled out of absorption liquid under these conditions, the refrigerating effect produced in the storage space 11 is reduced.

When the cooling element 10 again tends to rise above the desired low temperature, the tension of load spring 72 is increased to vary the resultant force exerted on the diaphragm 47 and effect movement of valve 54 toward its full open position, as described above. When the valve 54 is in its full open position the burner 26 is operating at what may be termed a "maximum flame" and when the valve is closed as much as possible and in its partially open position the burner is operating at what may be termed a "minimum flame."

In addition to controlling the rate of flow of gas to the burner 26 in response to temperature, the control device is operative to regulate the pressure of gas delivered to the burner. Assuming that the gas pressure in chamber 49 increases, there is a corresponding increase of gas pressure in chamber 78 so that the force exerted on the under side of diaphragm 47 is increased. This causes an upward movement of diaphragm 47 against the force exerted on the top side thereof by the load spring 72, thereby moving valve 54 toward its closed position and reducing the flow of gas through orifice 51. With less gas supplied to chamber 78 the gas pressure therein decreases, whereby the load spring 72 moves the valve 54 back to its original position.

Assuming that the gas pressure in chamber 78 decreases, less force is exerted on the under side of diaphragm 47, and the load spring 72 becomes effective to move the valve 54 downward to increase the flow of gas through orifice 51. With more gas supplied to chamber 78 the gas pressure therein increases, whereby the diaphragm 47 is moved upward against the force exerted on the top side by load spring 72, and valve 54 is moved back to its original position. It will now be understood that the control device 29 acts to maintain a substantially constant pressure of gas in chamber 78, so that the gas delivered to burner 26 is maintained substantially at a constant pressure.

By providing a control device of the type just described, only one valve is employed to control the flow of gas to the burner, regulate the pressure of the gas delivered to the burner, and control the maximum and minimum flame operation of the burner. With the device capable of controlling the minimum flame so that a flame is always maintained at the burner, the necessity for fully closing the valve and providing a pilot flame by-pass gas passage is avoided. Further, by controlling the maximum flange in the device, a restriction at the burner to limit the flow of gas is not necessary. The provision of the relatively strong flat spring 63 is desirable because any excessive force due to abnormal expansion of the expansible diaphragm 56 is taken up by spring 63, so that the internal parts of the device are not subjected to excessive force which would tend to impair the sensitivity of or otherwise injure the device.

In the embodiment just described the control device is of the spring regulated type and provided with the regulating or load spring 72. Instead of employing a spring to exert a force on the top side of diaphragm 47, the valve 54 may be weighted to maintain it in its partially open position and an additional weight may be added to cause the valve to move to its full open position. Such a modification is shown in Fig. 3 with parts similar to those shown in Fig. 2 indicated by the same reference numerals. By comparing Figs. 2 and 3 it will be noted that in the latter the regulating spring 72 is omitted and the lever 69' does not extend outside the casing 42. In Fig. 3 a coil spring 79 is connected to the outer end of lever 69' and the inward extending projection 67. The under side of lever 69' is provided with a flanged member 80 to which is loosely connected the upper end of a coil spring 81. To the lower end of spring 81 is secured a weight 82, and directly beneath the latter a weight 83 is fixed to the diaphragm 47.

The operation of the device shown in Fig. 3 is substantially the same as that described above in connection with the embodiment shown in Fig. 2. When the cooling element 10 tends to rise above the desired low temperature and the expansible diaphragm 56 expands, lever 69' is caused to move downward against the tension of spring 79. With sufficient downward movement of lever 69' the weight 82 rests on top of the weight 83. The combined weight of weights 82 and 83 is such that a force is exerted on the top side of diaphragm 47 which is effective to move valve 54 to its full open position. It will be noted that when the weight 82 is resting on the weight 83 any further downward movement of lever 69' will not disturb the full open position of valve 54 due to the loose connection of spring 81 to the lever 69'. In determining the total weight necessary to move the valve 54 to its full open position the weight of the spring 81 may also be included with that of the weight 82. With the valve 54 in its full open position so that the burner 26 operates with a maximum flame, heat is applied to the refrigeration system at such a rate that cold is produced in storage space 11, as explained above.

When the cooling element 10 tends to fall below the desired temperature and expansible diaphragm 56 contracts, the spring 79 is effective to move lever 69' upward. When the lever 69' is moved upward sufficiently, the weight 82 is removed from and no longer rests on the weight 83. The weight 83 is of such size that it exerts a force on the top side of the diaphragm 47 which is effective to maintain valve 54 in its partially open position. With the valve 54 in its partially open position the burner 26 operates with a minimum flame and the refrigerating effect produced in storage space 11 is reduced.

By employing a weighted diaphragm and valve to which an additional weight is added in response to temperature, the valve 54 is effectively controlled to maintain either a maximum flame or a minimum flame at the burner 26. The provision of the spring 81 whereby the weight 82 can be added and removed gradually overcomes the abrupt changes that would otherwise occur and tend to produce smoking at the burner. The sensitivity of the device will depend, of course, upon the strength of the spring 81 used. As in the embodiment first described, the device shown in the modification is also effective to regulate the pressure of the gas delivered to the burner 26.

While I have shown a resiliently supported weight which may be added to and removed from a weighted diaphragm, it will be obvious to those skilled in the art that such an arrangement may be employed to effect movement of any thermostatically controlled movable member, such as a thermostatically controlled float of a liquid fuel burner, which is operatively connected to a valve for controlling the flow of fuel to a burner. Although particular embodiments of the improved control device have been shown and described, therefore, I do not wish to be limited to the particular arrangements set forth, and I intend in the following claim to cover all modifications which do not depart from the spirit and scope of the invention.

What is claimed is:

A control device for a gas burner comprising a cylindrical casing containing a gas control valve, a circular diaphragm connected at its center to operate said valve, an expansible disc of an expansible fluid thermostat movable on the axis of movement of the center of said diaphragm, levers fulcrumed on said casing at points on opposite sides of said axis and projecting in opposite directions through said axis, connections between said expansible discs and one of said levers and between said levers so that movement of said expansible disc is multiplied in another of said levers, a spring connected between said second lever and one side of said diaphragm, the other side of said diaphragm being subject to pressure of gas on the outlet side of said valve, the tension of said spring being varied to change the load on said diaphragm by movement of said second lever, said second lever projecting through an opening at the side of said casing, and adjustable stops on the outside of said casing for limiting movement of said second lever.

SVEN W. E. ANDERSSON.